United States Patent [19]
Kohno et al.

[11] Patent Number: 5,253,740
[45] Date of Patent: Oct. 19, 1993

[54] AUTOMOTIVE POWER TRAIN WITH ANNULAR ELASTIC BODY FOR REDUCING VIBRATIONS OF FLYWHEEL ASSEMBLY

[75] Inventors: Satoshi Kohno; Shizuaki Hidaka, both of Kanagawa, Japan

[73] Assignee: Atsugi Unisia Corp., Atsugi, Japan

[21] Appl. No.: 757,239

[22] Filed: Sep. 10, 1991

[30] Foreign Application Priority Data

Sep. 10, 1990 [JP] Japan ................ 2-94857[U]

[51] Int. Cl.⁵ ................... F16F 15/12; B60K 17/00
[52] U.S. Cl. .................... 192/70.16; 192/30 V; 192/106.1; 74/574; 464/98; 464/162
[58] Field of Search .......... 192/30 V, 70.16, 70.17, 192/106.1; 74/574; 464/98, 162

[56] References Cited

U.S. PATENT DOCUMENTS

| | | | |
|---|---|---|---|
| 4,791,829 | 12/1988 | Fukushima et al. | 74/574 |
| 4,842,116 | 6/1989 | Fukushima | 74/574 X |
| 4,850,244 | 7/1989 | Eckel et al. | 74/574 |
| 4,890,709 | 1/1990 | Reik et al. | 192/70.17 |

FOREIGN PATENT DOCUMENTS

| | | |
|---|---|---|
| 57-58542 | 12/1982 | Japan. |
| 60-152856 | 10/1985 | Japan. |
| 62-100356 | 6/1987 | Japan. |
| 2-118228 | 5/1990 | Japan ........... 74/574 |
| 2-229939 | 9/1990 | Japan ........... 74/574 |
| 569963 | 6/1945 | United Kingdom ...... 74/574 |

OTHER PUBLICATIONS

*Mark's Standard Handbook for Mechanical Engineers*, Eighth Edition, New York, McGraw-Hill, 1978, pp. 5-2 to 5-5.

*Primary Examiner*—Richard M. Lorence
*Attorney, Agent, or Firm*—Bachman & LaPointe

[57] ABSTRACT

As a torque transmitting member, an annular resilient disc interconnects a crankshaft and an annular flywheel. The crankshaft has an axially extending cylindrical wall in opposed and spaced relationship to an inner peripheral wall of the annular flywheel. For reducing vibrations of annular resilient disc, an elastic annular body has an inner peripheral wall fixed to the crankshaft and an outer peripheral wall opposed to the inner peripheral wall of the flywheel. A heat insulating ring or heat insulating pieces are provided to reduce transmission heat from the flywheel to the elastic annular body. Alternatively, a heat insulating space or spaces may be provided.

3 Claims, 3 Drawing Sheets

AUTOMOTIVE POWER TRAIN WITH ANNULAR ELASTIC BODY FOR REDUCING VIBRATIONS OF FLYWHEEL ASSEMBLY

BACKGROUND OF THE INVENTION

The present invention relates to an automotive power train including an engine crankshaft and a flywheel.

Japanese Utility Model Application First (unexamined) Publication 62-100356 discloses an automotive power train (see FIGS. 1 and 2). According to this known power train, an annular resilient disc, serving as a torque transmitting member, has an inner peripheral portion connected to a crankshaft at an axial end thereof and an outer peripheral portion connected to a flywheel is formed with a plurality of circumferentially equi-distant windows around the central axial bore. A plurality of elastic bodies made of rubber are fixedly received in the windows of the flywheel, respectively, and a plurality of bolts extend through the elastic bodies to fixedly secure the inner peripheral portion of the annular resilient disc to the axial end of the crankshaft. Owing to the resiliency of the elastic bodies, the bending vibrations of the annular resilient disc are reduced.

An object of the present invention is to improve such a known automotive power train by eliminating a potential problem that the elastic bodies made of rubber degrade at a quick rate when subject to heat transmitted thereto from the flywheel, resulting in deformation or breakage.

SUMMARY OF THE INVENTION

According to the present invention, there is provided an automotive power train, comprising:

an engine having a crankshaft, said crankshaft having an axis and being rotatable about said axis;

a flywheel;

a torque transmitting member in the form of an annular resilient disc having an inner peripheral portion connected to said crankshaft and an outer peripheral portion connected to said flywheel;

said flywheel having a central axial bore and an inner peripheral wall means defining said central axial bore, said flywheel also having a radially extending wall including a working surface;

a clutch having a clutch disc frictionally engageable with said flywheel at said working surface;

said crankshaft having fixed thereto means defining an axially extending cylindrical wall disposed in said central axial bore in opposed and spaced relationship to said inner peripheral wall means;

an elastic annular body having an inner peripheral wall fixed to said cylindrical wall of said crankshaft and an outer peripheral wall opposed to said inner peripheral wall means, and said vibration reducing means also includes means for reducing transmission of heat from said flywheel to said elastic annular body.

DETAILED DESCRIPTION OF THE INVENTION

Figure 1:
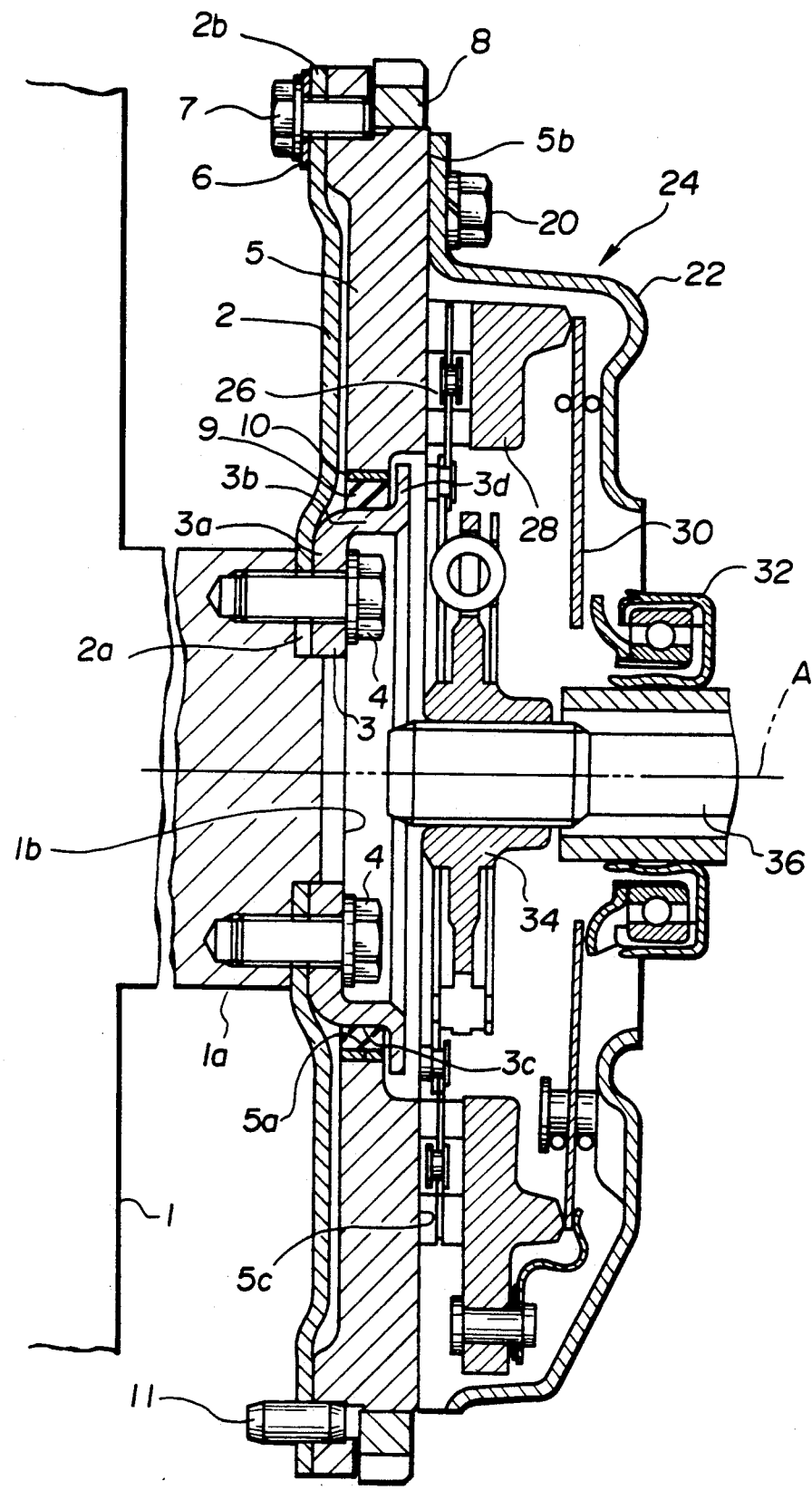
FIG. 1 is a fragmentary section of a first embodiment of an automotive power train according to the present invention.

Referring to FIG. 1, there is shown a portion of an automotive power train including, in diagram, an engine 1 having a crankshaft 1a. The crankshaft 1a has an axis A and is rotatable about the axis A. The crankshaft 1a has an integral reduced diameter section 1b connected thereto via an annular shoulder. Torque is transmitted from the crankshaft 1a to an annular flywheel 5 by means of a torque transmitting member in the form of an annular resilient disc 2. The annular resilient disc 2 has an inner peripheral portion 2a surrounding the reduced diameter section 1b and fixedly secured to the annular shoulder by means of a plurality of bolts 4 with a reinforcement member 3 interposed between the inner peripheral portion 2a and the bolts 4. An outer peripheral portion 2b of the annular resilient disc 2 is fixedly secured to the flywheel 5 on an outer peripheral portion thereof by means of a plurality of bolts 7 with an annular reinforcement plate 6 interposed between the outer peripheral portion 2b and the bolts 7. Centering of the annular resilient disc 2 with respect to the flywheel 5 is effected by a dowel pin 11. The annular resilient disc 2 reveals a sufficiently high rigidity against torsion in a rotational direction of the crankshaft 1a about the axis A, but a low rigidity against flexure in an axial direction along the axis A. The degree of flexure rigidity is variable with the shape and the thickness of the annular resilient disc 2. Thus, the natural frequency at which the bending vibrations of the crankshaft 1a take place can be varied.

Fixedly coupled with the flywheel 5 is a ring gear 8 adapted to be engaged with a pinion of a stator motor, not shown. The flywheel 5 has a central axial bore and an inner peripheral wall 5a defining the central axial bore. The flywheel 5 has a radially extending wall 5b including a working surface 5c.

Fixedly secured, by means of a plurality of bolts 20, on the radially extending wall 5b is a clutch housing 22 of a clutch 24. The clutch 24 is of the conventional type and includes a clutch disc 26, a pressure plate 28, a diaphragm spring 30 and a release bearing 32. The clutch disc 26 is supported by a hub 34 splined to a transmission input shaft 36. The clutch disc 26 is frictionally engageable with the working surface 5c on the radially extending wall 5b of the flywheel 5.

The reinforcement member 3 includes a radially extending annular portion 3a and an axially extending cylindrical portion 3b disposed in the central axial bore of the flywheel 5. The cylindrical portion 3b is formed with an axially extending cylindrical wall 3c which is opposed and spaced relationship to the inner peripheral wall 5a. Disposed between the mutually facing walls 3c and 5a is an elastic annular body 9 made of rubber. The elastic annular body 9 has an inner peripheral wall fixedly adhered to the cylindrical wall 3c of the reinforcement member 3 and an outer peripheral wall in opposed and spaced relationship to the inner peripheral wall 5a of the flywheel 5. An annular space defined between the outer peripheral wall of the elastic annular body 9 and the inner peripheral wall 5a is filled with a heat insulating ring 10. The heat insulating ring 10 is fixedly connected between the flywheel 5 and the elastic annular body 9. The reinforcement member 3 also includes a radially extending stop portion 3d.

Heat is generated in the process into firm engagement between the friction disc 26 and the flywheel 5 and penetrates inwardly from the working surface 5c. The heat is transmitted to the inner peripheral wall 5a. Owing to the provision of the heat insulating ring 10, further transmission of the heat to the elastic annular body 9 is eliminated or at least reduced, preventing the elastic annular body 9 from degrading. Thus, the elastic annular body 9 can keep on revealing a good performance in reducing bending vibrations of the annular resilient disc 2.

Since the good vibration reducing performance owing to the elastic annular body 9 is maintained for a prolonged period of time, the natural frequency of the crankshaft 1a can be kept within a desired range for the prolonged period of time.

Figure 2:
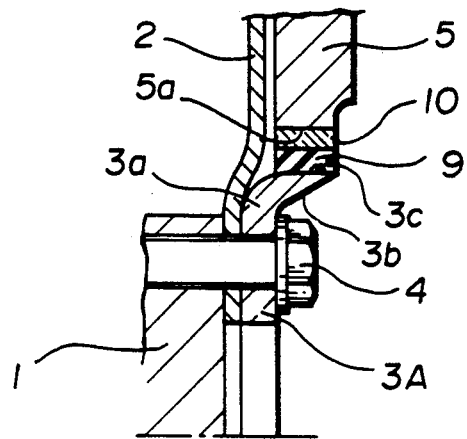
FIG. 2 is a fragmentary section of a second embodiment.

Referring to FIG. 2, a second embodiment is explained. This embodiment is substantially the same as the first embodiment illustrated in FIG. 1 except the use of a reinforcement member 3A instead of the previously described reinforcement member 3. The reinforcement member 3A is different from its counterpart 3 in that the stop portion 3d is not provided for ease of assembly and the axially extending cylindrical portion 3b is reduced in thickness toward a free axial end thereof for reduction of weight.

Figure 3:
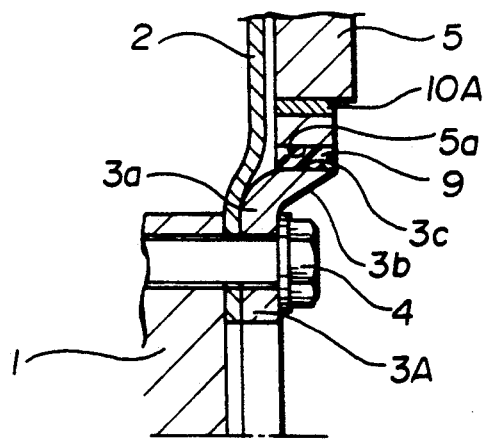
FIG. 3 is a similar view to FIG. 2 showing a third embodiment.

Referring to FIG. 3, a third embodiment is explained. This embodiment is substantially the same as the second embodiment except the following respects. First, a plurality of heat insulating pieces 10A are received in a plurality of circumferentially equi-distant windows, respectively, with which a flywheel 5 is formed. The plurality of heat insulating pieces 10A rearranged in such a manner as to surround an inner peripheral wall 5a of the flywheel 5 to reduce transmission of heat to the inner peripheral wall 5a. Second, an annular elastic body has an outer peripheral wall directly adhered to the inner peripheral wall 5a of the flywheel 5.

Figure 4:
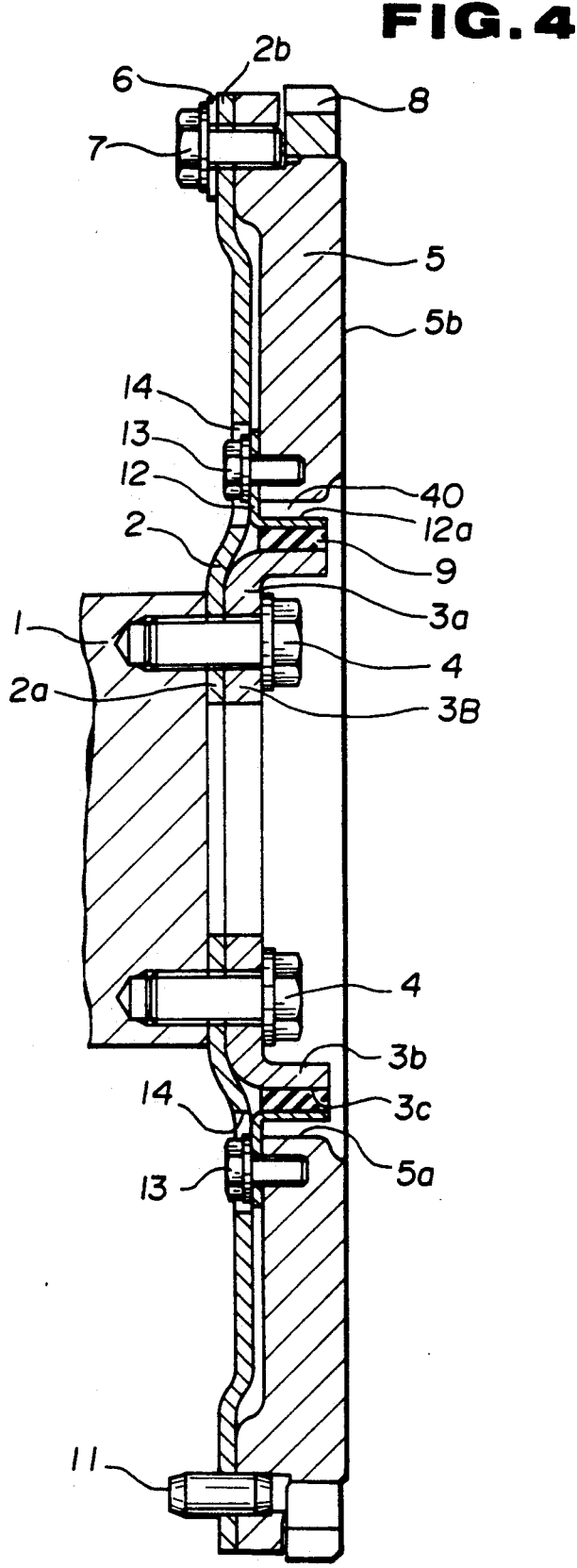
FIG. 4 is a similar view to FIG. 1 with a clutch removed, illustrating a fourth embodiment.

Referring to FIG. 4, a fourth embodiment is explained. This embodiment is substantially the same as the first embodiment shown in FIG. 1 except the following respects. First, a reinforcement member 3B different from the reinforcement member 3 is used. The reinforcement member 3B is different from its counterpart 3 in that it has no counterpart to the stop portion 3d. Second, instead of the heat insulating ring 10, a heat insulating annular space 40 is formed between an inner peripheral wall 5a of a flywheel 5 and an outer peripheral wall of an elastic annular body 9. Specifically, the heat insulating annular space 40 is defined between the inner peripheral wall 5a of the flywheel 5 and a cylindrical portion 12a of a bracket 12 that is secured to the flywheel 5 by means of a plurality of bolts 13. The elastic annular body 9 has the outer peripheral wall fixedly adhered to the cylindrical portion 12a of the bracket 12. Third, an annular resilient disc 2 is formed with a plurality of apertures 14 in which heads of the bolts 13 are disposed without any interference with the annular resilient disc 2. Preferably, the bracket 12 is made of a heat insulating material.

Figure 5:
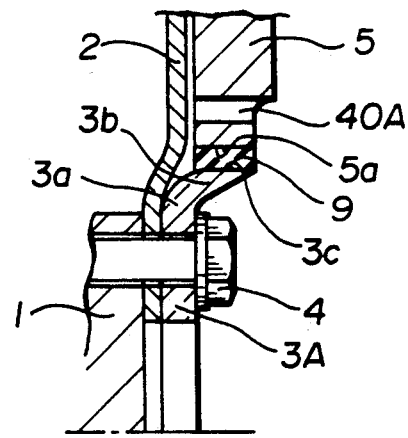
FIG. 5 is a similar view to FIG. 3 illustrating a fifth embodiment.

Referring to FIG. 5, a fifth embodiment is explained. This embodiment is substantially the same as the third embodiment shown in FIG. 3 except the following respect. That is, the heat insulating pieces 10A are removed from the windows and the windows are used as heat insulating spaces 10A as shown in FIG. 5.

What is claimed is:

1. In an automotive power train;
an engine having a crankshaft, said crankshaft having an axis and being rotatable about an axis;
a flywheel;
a torque transmitting member in the form of an annular resilient disc having an inner peripheral portion connected to said crankshaft and an outer peripheral portion connected to said flywheel;
said flywheel having a central axial bore and an inner peripheral wall means defining said central axial bore, said flywheel also having a radially extending wall including a working surface;
a clutch having a clutch disc frictionally engageable with said flywheel at said working surface;
said crankshaft having fixed thereto means defining an axially extending cylindrical wall disposed in said central axial bore in opposed and spaced relationship to said inner peripheral wall means;
an elastic annular body having an inner peripheral wall fixed to said cylindrical wall of said crankshaft and an outer peripheral wall opposed to said inner peripheral wall;
means for reducing transmission of heat from said flywheel to said elastic annular body, said transmission of heat reducing means including a heat insulating ring disposed between said outer peripheral wall of said elastic annular body and said inner peripheral wall means of said flywheel; and
wherein said means defining said axially extending cylindrical wall has a reinforcement member fixedly secured to said crankshaft with said annular resilient disc interposed between said crankshaft and said reinforcement member, and said reinforcement member includes an axially extending cylindrical portion formed with said axially extending cylindrical wall.

2. An automotive power train as claimed in claim 1, wherein said reinforcement member includes a radially extending stop portion.

3. An automotive power train as claimed in claim 1, wherein said axially extending cylindrical portion of said reinforcement member is reduced in thickness toward a free end thereof.

* * * * *